(12) United States Patent
Harris

(10) Patent No.: US 6,604,047 B1
(45) Date of Patent: Aug. 5, 2003

(54) NON REAL TIME TRAFFIC SYSTEM FOR A NAVIGATOR

(76) Inventor: Scott C. Harris, P.O. Box 927649, San Diego, CA (US) 92192

( * ) Notice: Subject to any disclaimer, the term of this patent is extended or adjusted under 35 U.S.C. 154(b) by 0 days.

(21) Appl. No.: 09/682,200

(22) Filed: Aug. 3, 2001

(51) Int. Cl.[7] .............................................. G01C 21/26
(52) U.S. Cl. ...................... 701/213; 701/201; 701/207; 701/214; 340/988; 342/357.01; 342/357.08
(58) Field of Search ................................ 701/200, 201, 701/206, 207, 211, 213, 214; 340/988, 990, 995; 342/357.01, 357.06, 357.08, 357.13

(56) References Cited

U.S. PATENT DOCUMENTS 5,790,974 A * 8/1998 Tognazzini ................. 701/204
5,909,440 A * 6/1999 Ferguson et al. ........... 370/389
6,199,009 B1 * 3/2001 Meis et al. .................. 701/202
6,208,934 B1 * 3/2001 Bechtolsheim et al. ..... 701/209

FOREIGN PATENT DOCUMENTS

| EP | 2 298 539 A | * | 4/1996 |
| JP | 410300485 A | * | 11/1998 |

\* cited by examiner

Primary Examiner—Gertrude Arthur

(57) ABSTRACT

A system for improving the operation of a GPS based navigator. Statistical and/or time of day information is used to select the best route between a current location and a desired location. The statistical information may take into account anomalies, and a user can select the amount of risk they which take. The system can be updated with more updated information. In addition, the selection of the desired location can be carried out by downloading information from a PDA.

24 Claims, 3 Drawing Sheets

NON REAL TIME TRAFFIC SYSTEM FOR A NAVIGATOR

BACKGROUND OF INVENTION

Various systems, including but not limited to the Magellan 750 ("NeverLost (TM)") device automatically track the user's whereabouts and instructs the user on the best way to get from point A to point B. For example, systems such as this may find the user's current position using satellite positioning systems such as the GPS constellation array. The user may enter a desired location. The program includes map data which includes a time that it will take, on average, to traverse a given stretch of roadway. This data may be acquired by simply dividing the speed limit by the length of the roadway. The system carries out a program to determine a most efficient way for the user to get to his desired location.

This system may operate admirably, and almost always results in the user getting to their desired location. However, the selection of routes does not take into account the real situation. For example, the user who knows an area will often select a better route than the computer will select.

SUMMARY OF INVENTION

The present application teaches an improvement to existing navigator systems which enables improvements and new techniques in selection of routes.

In one aspect, the present application teaches use of statistical data in selecting the proper route.

In another aspect, the system may use real-time information.

An interface with the information stored in a PDA is disclosed.

Another aspect teaches a way in which the route may be calculated to allow the user to start in the proper direction.

Yet another aspect teaches a way of using the system to determine a location in for the user to obtain some desired product or service.

BRIEF DESCRIPTION OF DRAWINGS

These and other aspects will now be described in detail with reference to the accompanying drawings, wherein.

DETAILED DESCRIPTION

Figure 1:
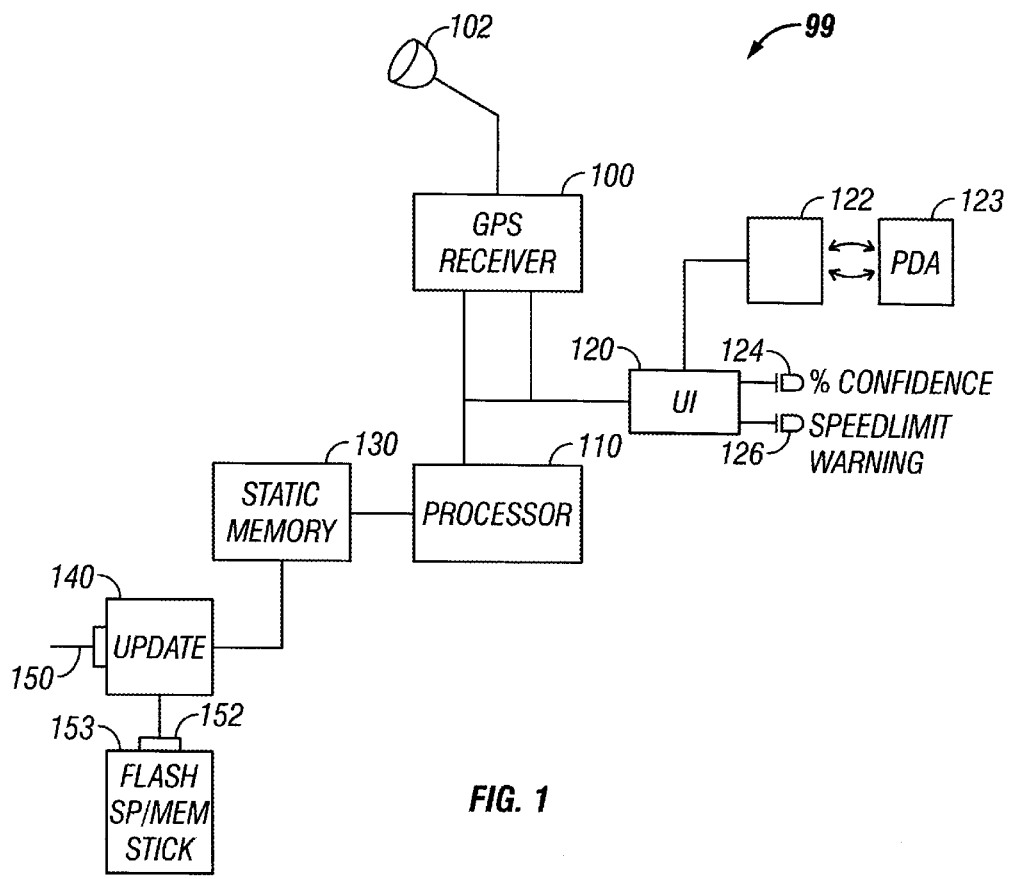
FIG. 1 shows a block diagram of the system.

A block diagram of the system is shown in FIG. 1. A GPS receiver 100 is shown connected to an appropriate GPS antenna 102 to track the location of the installed device 99. This location may be in a vehicle, for example. A processor 110 is connected to the GPS receiver and may control the operation of the GPS receiver and also receive incoming information therefrom. The processor is connected to a memory 130 which is shown herein as a static memory. In current technology, this may be a hard drive, but could alternatively be flash memory or another kind of read/write memory. The memory is connected to an update module 140. As shown, the update module may have a connection to a network line 150 which may be a telephone, an thernet connection, or any other kind of connection to any source of information. The update module may also include a connector 152 allowing connection of a portable memory shown as 153. The portable memory, for example, may be camera type memory, such as flash memory, S.D. memory, or a memory stick. The memory is used for updating information, as described herein.

A user interface 120 is connected to the processor, and provides information to a user, as well as accepting input from a user. The input may be provided from the user in a conventional way, such as on a miniaturized keyboard or trackwheel. An alternative data information is via a PDA interface assembly shown as 122. This may enable a user to enter information about their desired route or destination into PDA 123. Downloading of such desired routes are already available on certain Web sites such as HTTP:// www.MapQuest.com.

Alternatively, the PDA often stores addresses indicating the addresses of the user's contacts. The address from the PDA may be also transferred to the PDA interface device 122. The PDA interface device may be for example an infrared port, for those PDAs which have infrared capability. For example, on Palm operating system devices, the user of the PDA can select the option to "beam address". The Palm unit will then beam the address to the interface device 122 which receives and decode to the beamed address, and uses that as the desired location. Alternatively, the interface device may be a connection to the serial, parallel or USB port on the PDA.

The user interface also includes a keyboard as described above and a display. Additional functions may be provided. One such function is the indicator 124, which may indicate, for example, the likelihood that the device is actually tracking the proper location of the installed device 99. Many times, the GPS receiver has not adequately acquired sufficient data to be sure that it knows its proper location. When that happens, the GPS receiver may return its best guess information, but might not be very sure or of that information. Accordingly, the indicator 124 may be a bicolor LED which may be green to indicate that the GPS receiver is highly confident in its current location. It may be red to indicate that the confidence level in the current location is low. Another indicator at 126 is a speed limit warning. The map data stored in the static memory 130 often includes the road's speed limits. As part of the synchronization via the GPS receiver, the system automatically acquires the speed of the vehicle. The indicator 126 may be a settable indicator that indicates when the user, for example, is going 10 mph above the speed limit.

The static memory 130 stores information about maps and routes within those maps. In order to make a decision about the best route to take, the static memory often needs information about how long it will take to get from one point in the map to another. The routines of FIG. 2 may be used according to this embodiment to get this information. Certain existing satellite systems, such as the etak system, provide traffic reports that indicate to user the current status of current traffic. The main problem with this system, however, is that the traffic report is current as of the time it is given, not when the user actually arrives there. Many users lose confidence in such traffic reports because by the time they arrive at the scene, the traffic may be changed. In addition, the infrastructure necessary to provide such real-time information may be extremely costly.

The present application teaches a system which may improve the ability to find the best route, but does so using a statistical technique. According to the present system, information about real progress through certain roots is accumulated. This data is accumulated as a function of time of day. The information is used to form statistical data. The statistical data may include, for example, the percent of anomalies. One example is anomalies caused by special events. Roadways which pass close to situses of events may often have high traffic at the time of the event. By noting the number of times that anomalies occur, the "expected value" of the time of a trip may be lowered.

A route may be selected based on different parameters. For example, the route may be selected for the one which is most consistently clear. Anomalies may be taken into account when calculating the route, but the user may choose to take a chance that any route will still be the best. All of this is at the user's discretion, but allows the system to have more accurate data based on statistical analysis.

Figure 2:
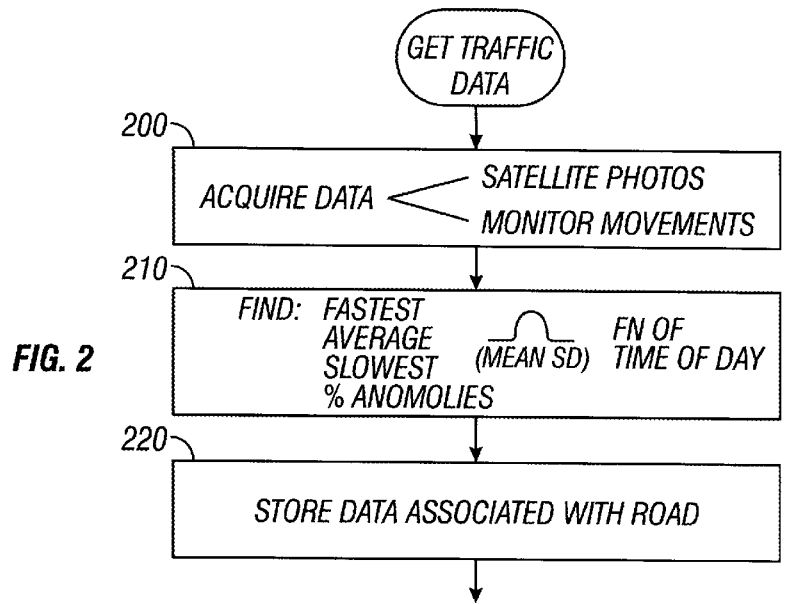
FIG. 2 shows a flowchart of finding traffic information.

The date acquisition routine is shown in FIG. 2. The heart of the data acquisition routine is 200 which acquires real data from real movements. This may be carried out via monitoring satellite photos, for example, to find different movements of different vehicles. Since satellite photos are often taken at separated times, these movements may be used to find the average time to traverse a given stretch of roadway. Another technique, which is disclosed herein, is made possible by the fact that the unit 110 actually tracks users movements. Accordingly, the second alternative is to monitor movements within the installed vehicle 99, and later obtain information from many different users as part of the update routine.

In this contemplated that certain users will not want their movements to be monitored, for example based on privacy concerns. This system will therefore provide the user with the capability of making their movements private. However, a certain advantage may be offered to those users who allow data about to their movements to be uploaded as part of the update routine. Note that the data can be anonymous data, i.e. it can be uploaded without any indication of its origin. As an example of the advantage provided to those users who allow the data to be uploaded, a user may receive a discount on updates if they allow their data to be uploaded as part of the process.

At 210, the real-time data is used to find the various information about the different roadways. As a function of time of day, this system may find the fastest time, slowest time, average time, as well as higher order statistics about these times. These higher order statistics may include mean and standard deviation. Another parameter which may be used includes likelihood of anomalies: indicating a percentage of the time that the actual time to traverse is significantly different then the average time to traverse. All of this information is accumulated into a form associated with the stretch of roadway and will be stored in the static memory 130. The storage of the data is shown occurring at 220.

Figure 3:
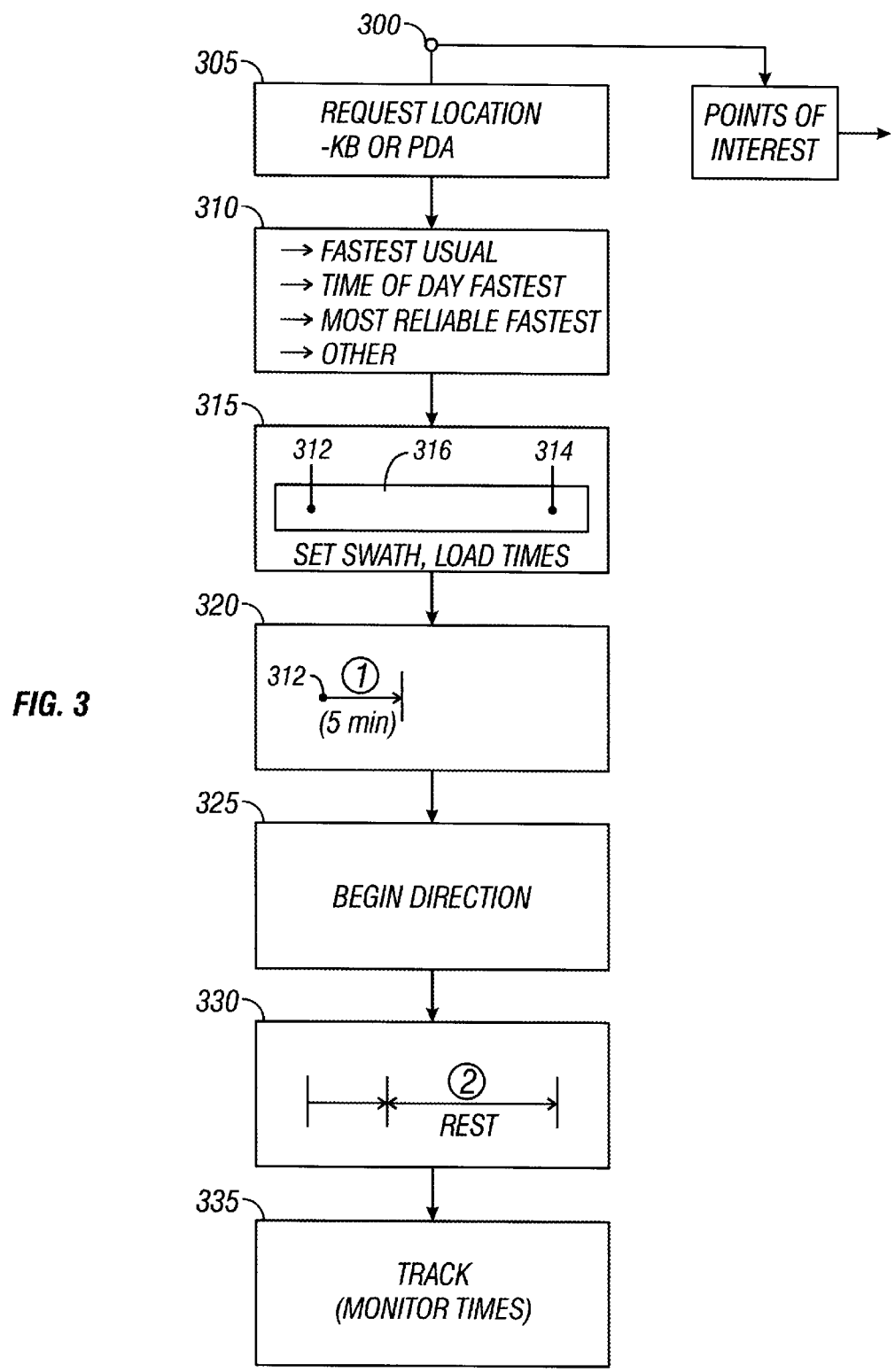
FIG. 3 shows a flowchart of route finding operations.

This information may change over time, and therefore frequent updates may make the system more accurate. These updates may also include additional map information. The updates may be provided in any desired form via the update module 140. The manufacturer or map issuer may charge for those updates as described above. The actual operation of the system uses the flowchart shown in FIG. 3. At 300, the user is allowed to select between a number of different operations, including requesting a mapping to a location at 305. An alternative allows the user to look for "points of interest" which is described in the flowchart of FIG. 4.

After requesting a current location, the user is presented with a number of options at 310. These may include conventional options such as shortest time, shortest distance, and least use of freeways. In addition, some enhanced options are shown as being provided. A new option includes fastest usual, which will set the route based on the fastest route which would be usual over all times. Another new option is time of day fastest, which selects the fastest route for the current time of day. This may divide the time of day generally into morning rush, evening rush, afternoon, and non Roche. Alternatively, the slices may be the sliced thinner, e.g. in one hour increments. Another new option is most reliable fastest, meaning the route that is most reliable to get one to the destination in the shortest time.

After selecting the option at 310, the system initially, at 315, selects a swath 316 around the current location 312 and the destination 314. This area 316 may be the area within which the route will be selected. At 320, the system first routes a first portion of the route, which begins at 312, and moves the user in the proper direction towards the destination. Users often do not want to wait while the system calculates the entire route from their current location to their destination. Such calculation may take minutes, and users will often not wait those minutes. This system therefore selects a relatively small part of the route e.g. the route for the next five minutes. This portion is initially calculated at 320, following by the system beginning the process of directing the user at 325. This may point the user in the right direction, while the remainder of the route is calculated at 330. After 330, the system continues the tracking and monitoring operation. This is generically shown as 335.

Figure 4:
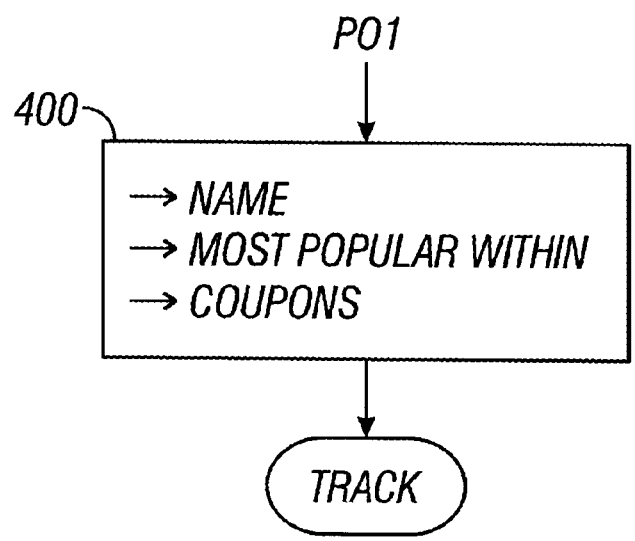
FIG. 4 shows a flowchart of finding points of interest.

FIG. 4 shows the points of interest setting. In conventional GPS units, the points of interest setting enables the user to find items close to them such as parks, restaurants, service stations. If the user is in an unfamiliar location, this may be very helpful. However, the device provides no information about which of many places to select other than name and distance/time to travel.

The present application recognizes that more frequent access usually indicates that the point of interest may be interesting. Accordingly, at 400, a new setting is provided indicating the point of interest within a specified type that is "most popular". This may indicate a point of interest that is most popular within a five-minute drive or the like. Again, this is based on monitoring other users movements, and may be used as part of an update routine.

Another aspect recognizes that many people are driven by specials such as coupons. In this embodiment, an option may provide coupons from certain points of interest. A coupon code may be provided by the processor based on information obtained during an update. For example, the coupon may be a six digit alphanumeric code that meets a specified checksum and provides a specified amount of discount at the specified location. The coupon information obtained during the update may have an expiration date, and may have a number of times that the coupon can be used.

Although only a few embodiments have been disclosed in detail above, other modifications are possible. All such modifications are intended to be encompassed within the following claims.

What is claimed is:

1. A system, comprising:

a position monitoring element, monitoring a current position; and a processor element, allowing mapping between the current position and a desired location, said mapping carried out based on statistical information about routes between the current position and the desired location.

2. A system as in claim 1, wherein said processor element includes a memory storing map information, and time information about a time to travel between different locations within the map information, wherein said time information includes information as a function of time of day that the traveling will occur.

3. A system as in claim 2, wherein said time information further includes information about higher order statistical variations within the time to travel between said different parts.

4. A system as in claim 1, further comprising a user interface, allowing a user to select the desired location.

5. A system as in claim 4, wherein said user interface includes an interface to a PDA allowing information in the PDA to be used to select the desired location.

6. A system as in claim 1, further comprising an update function, providing more updated information about said routes.

7. A system as in claim 1, wherein said processor element carries out said mapping by first mapping a portion of the route closest to the current position, but less than the entire portion of the route, beginning a guiding operation which guides a user of the system along the route, and subsequently finishing said mapping by mapping the remainder of the entire portion of the route.

8. A system as in claim 7, wherein said portion of the route closest to the current position includes a portion of the route which will take a specified amount of time to travel.

9. A system, comprising:
a position monitoring element, monitoring a current position; and
a processor element, allowing mapping between the current position and a desired location, said mapping carried out based on information about routes between the current position and the desired location which is specific to a specified time of day.

10. A system as in claim 9, wherein said processor element includes a memory storing map information, said map information including time information to move between different parts in a map within the map information as a function of time of day, and wherein said mapping comprises selecting mapping information based on a current time of day from different information within said map information.

11. A system as in claim 10, wherein said processor element also carries out mapping based on statistical information about said routes.

12. A system as in claim 11, wherein said statistical information includes at least standard deviation of time to traverse the route.

13. A system as in claim 9, further comprising a PDA, physically separate from said processor element, having a user interface allowing a user to select the desired location, wherein said PDA includes an interface to said processor element, allowing the PDA to provide information to the processor element.

14. A system as in claim 9, wherein said position monitoring element includes a GPS system.

15. A system, comprising:
a position monitoring element, monitoring a current position of an installed vehicle, said position monitoring element producing information indicative of said current position;
a processor element, including an associated memory, responsive to said information indicative of said current position, operating to determine mapping information, based on stored map data in said memory, and to determine information about said current position relative to the said mapping information; and
a user interface for said processor element, and enabling entry of information to obtain said mapping information, said user interface including an interface to a PDA which enables information in the PDA to be used to select said mapping information.

16. A system as in claim 15, wherein said mapping information includes a map of a route to a desired location, and wherein said information in the PDA is used to set said desired location.

17. A system as in claim 16, wherein said information in the PDA includes an address for a desired contact, which address is used to set said desired location.

18. A system as in claim 16, wherein said mapping information includes routing information between said current position and said desired location.

19. A system as in claim 16, wherein said interface to the PDA includes an infrared interface.

20. A system as in claim 16, wherein said interface to the PDA includes a wired interface.

21. A system as in claim 16, wherein said interface to the PDA includes an interface connection that is used for synchronizing the PDA contents with another computer.

22. A system, comprising:
a memory, storing mapping information,
a user interface, allowing the selection of a destination; and
a processor, operating based on said selection of said destination, and said mapping information from said memory, to calculate automatically a route to said destination, said processor operating to first map a first portion of the route which will first be followed and produce an output indicative of a display of information, and to subsequently map a second portion of the route, after said output is produced.

23. A system as in claim 22, wherein said first portion includes a portion of the route which will take a specified amount of time to travel.

24. A system as in claim 22, further comprising a position monitoring element, monitoring a current position, and wherein said processor calculates said route from said current position to said destination.

* * * * *